Sept. 25, 1951 — C. D. PETERSON — 2,569,333
INSULATED UNION NIPPLE
Filed July 8, 1949
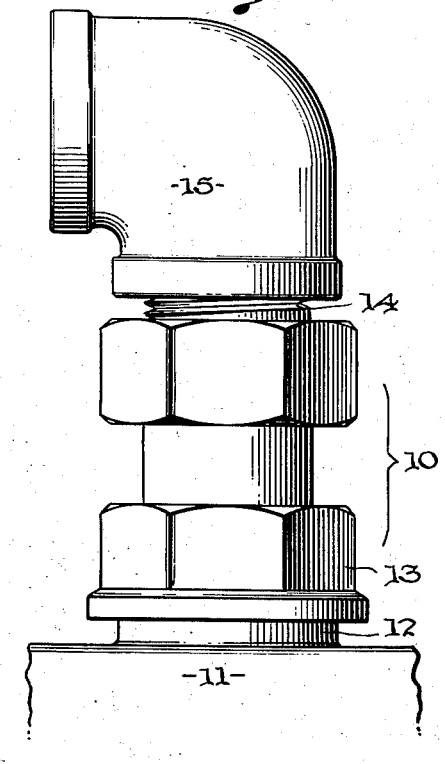
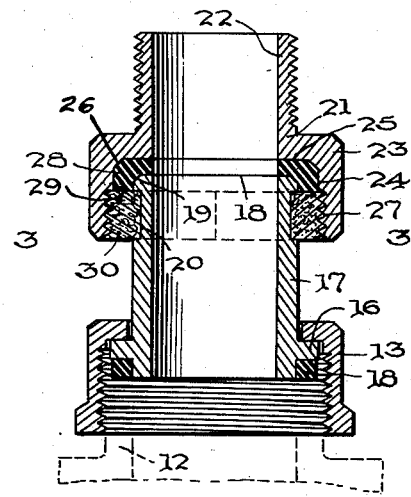
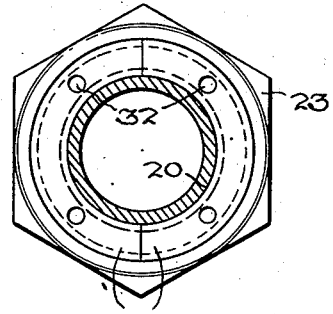
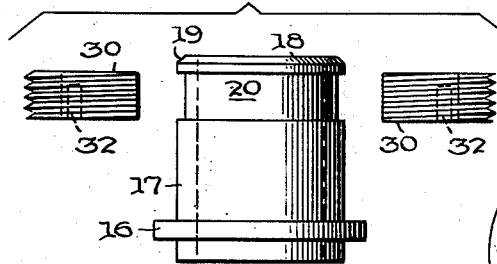
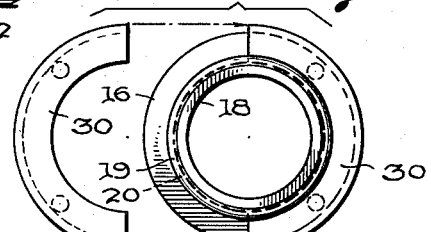
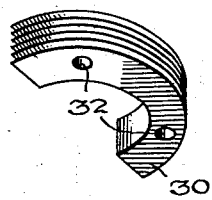
INVENTOR.
CHARLES D. PETERSON
BY Leech + Radue
ATTORNEYS Patented Sept. 25, 1951

2,569,333

UNITED STATES PATENT OFFICE 2,569,333

INSULATED UNION NIPPLE

Charles D. Peterson, Dallas, Tex., assignor to Universal Controls Corporation, Dallas, Tex., a corporation of Texas Application July 8, 1949, Serial No. 103,647

6 Claims. (Cl. 285—16)

This invention relates to pipe fittings, and more particularly to such fittings having the opposite ends electrically insulated from each other whereby electric current is prevented from flowing in the pipe line including the fitting.

It is a general object of the present invention to provide a novel and improved insulated pipe fitting.

More particularly it is an object of the invention to provide a pipe fitting of any desired type having electrical insulation or packing between the two ends thereof in the form of a compressed cup of electrical insulating material resistant to the substance flowing in the pipe.

It is an important object of the present invention to provide a simplified pipe fitting in which two metal parts are telescoped and have arranged between them elastic electrical insulating material, together with a split ring of insulating material locking the parts together and putting the elastic material under compression.

An important feature of the present invention resides in a structure which is mechanically strong and is not reliant on bonding between metal and insulation to provide the strength.

Another important feature of the invention resides in the provision of an insulated meter swivel having the same physical dimensions as the usual metal swivel whereby the latter can be replaced without any cutting of pipes or fitting operations.

Other and further objects and features of the invention will be obvious as the description proceeds, it being understood that such changes and modifications may be made in the single exemplary embodiment, described, and shown in the appendent drawings as fall within the scope of the attached claims without departing from the spirit of the invention.

In said drawing:

Fig. 1 is a side elevation of an insulating fitting or swivel constructed in accordance with the present invention, shown as applied to the inlet of a gas meter and fitted at the upper end into an L;

Fig. 2 is a longitudinal central section through the insulating fitting;

Fig. 3 is a transverse section taken on line 3—3 of Fig. 2;

Fig. 4 is an elevational view of the tail piece of the coupling with the split threaded ring of rigid insulation shown spaced on the two sides thereof;

Fig. 5 is a top plan view of the parts of Fig. 4 with one half of the split ring shown positioned in its groove; and Fig. 6 is a perspective view of one of the halves of the split ring.

Many efforts have been made to provide insulating coupling for pipe lines in order to prevent the flow of electric currents through these lines. Some of these have been fairly satisfactory for special purposes, but no wholly satisfactory device corresponding to the usual standard pipe fitting has been developed. The present invention contemplates the provision of such fittings which overcome all previous difficulties. For convenience a gas meter swivel or nipple of the union type has been illustrated and will be described, but it will be clear that this constitutes no limitation in form, the novel features being applicable to most any standard type fitting. The fitting shown is capable of being substituted for any standard all metal nipple without changes in the position of the meter or surface pipes and without requiring the cutting or fitting of any parts. The device of the present invention compares in all physical dimensions with the all metal fitting which it replaces.

It is the custom in residences and other buildings to ground various electrical devices to the water pipes. Thus the electrical conduits are grounded during the building operation, the telephone system is grounded, particularly the lightning arrester thereof, when the telephones are installed, and radios and other devices are customarily grounded to water or heat pipes by the occupants or by installation mechanics. The stray currents flowing from these connections and other sources may reach the gas lines in the house through the hot water heater or other appliance, or through fortuitous contact between water and gas pipes in close fitting pipe channels and the like. The operators of gas distribution systems make costly efforts to avoid corrosion of their underground pipes as the result of electrolysis and are naturally extremely desirous of preventing the entrance of stray electric currents into their pipe lines in the manner described above. They go to great pains to coat and/or wrap the underground pipe and also use various types of cathodic protection for the piping. Only by placing an insulating fitting at the inlet side of the gas meter to block stray currents as described can they exclude them from their system and permit them to be grounded out through the water lines.

Referring now to the drawings, the present invention is illustrated generally by the reference character 10 and is shown applied to a meter 11 of the so-called "cast iron case" type, having the externally threaded attaching spud 12 projecting upwardly therefrom. The threads receive the union nut 13. The upper end of the fitting 10 has an externally threaded nipple portion 14 adapted to be received, for instance, into a standard pipe fitting, such as the L 15.

Fig. 2 shows the construction. The union nut 13 has its inturned upper end bearing on a circumferential bead or flange 16 formed integrally with the tubular tail piece 17. The flange is above the lower end of the tail piece to provide an annular channel for the usual gasket 18 of suitable resilient material non-reactive with the ingredients of the gas carried in the pipe.

The opposite end of the tail piece is cut off squarely as at 18 and the outer corner is slightly chamfered or rounded as at 19. About one-eighth of an inch in from the end a shallow external channel 20 is cut into the tail piece a distance somewhat less than half its thickness. The free end of the tail piece is adapted to telescope loosely into the bore of a nut-nipple unit or adapter fitting 21 for a distance equal to that from the end of the tail piece to the remote wall of the channel 20. This adapter fitting comprises a nipple portion 22 externally threaded as shown and an internal nut section 23 octagonal or hexagonal on its periphery for reception of a wrench to thread the nipple into another pipe coupling as shown. The nipple and nut sections are through-bored and the latter only is counter-bored at 24 to a diameter approximately one-fourth of an inch greater than that of the outer surface of the tail piece. The bottom of the bore is flat, providing a shoulder at 25 and the junction of the flat and cylindrical walls may be provided with a fillet as at 26. The top portion of the cylindrical wall 24 is internally threaded at 27.

A packing in the form of cup 28 of resilient non-conducting material is formed to have a close fit in the bore 24 and against the shoulder 25 and has its center portion removed in line with the opening in the nipple 22. The external surface of the cup is a close fit in the bore 24 and reaches up to the beginning of the threads 27. It has a flat end surface 29 and an inner bore somewhat less in diameter than that of the external diameter of the tail piece whereby when the parts are assembled, as shown in Fig. 2, the cup is distended by the action of forcing the tail piece into position and caused to press radially against the walls 24 to make a gas tight fit.

The two metal parts of the fitting are held assembled by means of a collar or ring 30 of substantially rigid insulating material, which is divided diametrically and threaded externally to cooperate with threads 27 of the nut. This collar 30 has a close fit in the channel 20 in the upper end of the tail piece and when engaged therein and in the nut threads secures the metal parts together and insulates them. The collar is manipulated by means of a suitable spanner wrench having small pins adapted to be received in one or more holes 32, of which two are shown in each half of the locking ring. When this ring is tightly screwed down drawing the two parts together it forces the end of the tail piece into the resilient cup as previously described whereby it engages and compresses the cup against the shoulder 25 in the nut. The ring itself also engages the flat outer surface 29 of the cup and compresses it longitudinally. Under these conditions a gas tight fit is insured, for the nipple engages a cup of less than its diameter whereby radial tightness is insured and longitudinal tightness is effected both by pressing the tail piece against the bottom of the cup and compressing the cup longitudinally by direct engagement with the threaded collar. Thus the cup may be said to be under "volumetric compression" which tends to reduce its total volume as distinguished from mere mass displacement.

Additional insurance for gas tightness is achieved by liberally coating the surfaces of the cup with a suitable adhesive after the cup and the metal contacting areas have been carefully cleaned. Needless to say this adhesive should be a good electrical insulator and have characteristics permitting it to bond the cup to the metal parts.

A certain amount of the adhesive is also placed on the locking ring threads to insure against its removal either accidentally or intentionally.

The material of the metal parts may be ferrous or non-ferrous. As a matter of fact, where replacements for all metal swivels are to be made, the old ones can be salvaged for the union nut and the tail piece, which latter can be formed by cutting off the male threaded ends to the proper length and machining the groove 20 and chamfer 19. The only new material is for the nut unit and the two insulating parts.

The rubber cup, which must be resistant to the various materials in the gas as well as a good insulator, is preferably vulcanized as a finished piece of Buna-N or Hycar rubber and is thus an oil, water and gas resisting synthetic compound. The adhesive used, which must also be of high electrical resistance, and non-reactive to chemicals in the gas, is preferably a mechanical adhesion of great strength and highly resistant to atmospheric aging. The threaded split insulating collar or ring may be made of any suitable plastic having the necessary strength in shear and compression, having appropriate insulating properties and being sufficiently elastic to eliminate chances of cracking where lateral strain may be applied in the assembly or use of the parts. A molded "Nylon" plastic has been found satisfactory for this purpose. This is quite pliable or flexible and in the combination shown has resisted longitudinal stresses of approximately five tons, which is far more than the fitting will ever be subjected to in use, since the meters hanging from them never weigh more than sixty pounds. The wrench strain in assembling a swivel in accordance with the present invention is very little, for the wrench is applied to the nut 23 in inserting the nipple 22, and these parts are all metal and integral. When tightening the opposite end by turning the union nut 13 against the gasket 18 very little torque is applied to the tail piece, although the fitting may be under slight compression or tension.

The split ring gives an opportunity for a slight amount of play between the upper and lower parts of the coupling so that if there is a minor misalignment the canting resulting therefrom when the threads are tightened, can produce a slight angular movement between the tail piece and the nut portion which only serves to slightly change the pressures about the surface of the cup without having any tendency to draw any seams open.

All in all, the bushing is substantially as sturdy as the all metal one, is just as gas tight and since it has all the dimensions of the conventional fittings can be used to replace them with the utmost simplicity. The three well known "cast iron case" meters used for most outdoor installations each requires a slightly different fitting and such would have to be provided for the several meters. They would also have to be made in several sizes to accommodate various service pipe line sizes.

Obviously a straight nipple type may be made for use with the so-called "tin case" gas meters, and other fittings constructed for many purposes by making use of the essential features of this invention.

I claim:

1. An insulating pipe fitting comprising in combination, a metal part having a bore including a shoulder at the bottom and a threaded length at the outer end, a tubular metal tail piece adapted to telescope loosely into said bore and having a groove in the outer surface above the inner end, a cup of elastic insulating material bottomed on said shoulder and tightly engaging the inner end of said tail piece and a two part ring of rigid insulating material closely fitting in said groove and threaded into said part to compress the cup between the part and tail piece.

2. An insulating fitting comprising in combination, a bored nut part formed of metal and having means to engage a complemental pipe fitting and having a counterbore providing a bottom shoulder and an outer threaded section, a metal tail piece part having means for attachment to a complemental fitting and a straight tubular portion adapted to be loosely received in said counterbore, said portion having a wide shallow groove near its outer end, a centrally perforated cup of insulating material surrounding the terminal part of said portion beyond said groove, engaging the counterbore and extending between the flat end of the said portion and said shoulder, and a two part ring of insulating material closely fitting said groove and having its outer periphery threaded and engaging the threads in said counterbore to hold the parts together against the cup.

3. The insulating fitting of claim 2 in which the cup is resilient and the inner end of the ring is forced into engagement with the rim of the cup to put the material of the latter under volumetric compression.

4. In a pipe fitting, in combination, a unitary bored and counterbored metal part, threads in the outer portion of the counterbore, a metal part including a tubular portion of less diameter than the counterbore and extending into the same, a circumferential groove near the end of said tail piece, a collar of insulation closely slidably fitting said groove and externally threaded into the counterbore threads to secure the parts together, and a resilient packing element of insulation compressed between the parts in said counterbore.

5. The fitting as defined in claim 4 in which the packing is cup-like, formed of vulcanized gas, water and oil resistant synthetic rubber, said cup having a part compressed radially between the counterbore and tubular portion and a part compressed longitudinally between the end of the tubular portion and the bottom of the counterbore, said collar engaging the rim of said cup to increase the volumetric compression thereof.

6. An insulated gas meter nipple comprising in combination, a metal tubular tail piece having a circumferential flange near one end, a meter union nut retained by said flange, the opposite end of the tail piece being squared off with the outer corner relieved, a shallow circumferential groove in the outer wall of said tail piece near said opposite end, a part for cooperation with said tail piece including a nut and integral external threaded nipple, said part being bored longitudinally and counterbored in the nut to loosely receive the end of the tail piece, the outer end of the counterbore being threaded, a cup of resilient insulation seated at the base of the counterbore and having a central opening, the end of the tail piece being seated in the cup to compress the material of the latter in at least two directions and a split ring of insulation closely fitting said groove, threaded into said counterbore and bearing on the outer rim of the cup.

CHARLES D. PETERSON.

REFERENCES CITED

The following references are of record in the file of this patent:

UNITED STATES PATENTS

| Number | Name | Date |
|---|---|---|
| 883,080 | Bullock | Mar. 24, 1908 |